United States Patent
Tolt

(10) Patent No.: US 7,459,839 B2
(45) Date of Patent: Dec. 2, 2008

(54) LOW VOLTAGE ELECTRON SOURCE WITH SELF ALIGNED GATE APERTURES, AND LUMINOUS DISPLAY USING THE ELECTRON SOURCE

(76) Inventor: Zhidan Li Tolt, 4018 Ellmar Oaks Dr., San Jose, CA (US) 95136

( * ) Notice: Subject to any disclaimer, the term of this patent is extended or adjusted under 35 U.S.C. 154(b) by 0 days.

(21) Appl. No.: 10/707,342

(22) Filed: Dec. 5, 2003

(65) Prior Publication Data

US 2005/0127351 A1    Jun. 16, 2005

(51) Int. Cl.
*H01J 9/02*    (2006.01)

(52) U.S. Cl. .................. 313/310; 313/311; 313/336

(58) Field of Classification Search .............. 257/12–19, 257/10; 313/309, 310
See application file for complete search history.

(56) References Cited

U.S. PATENT DOCUMENTS

| | | | |
|---|---|---|---|
| 5,564,959 A | 10/1996 | Spindt et al. | |
| 5,869,922 A | 2/1999 | Tolt | |
| 5,990,604 A | 11/1999 | Geis et al. | |
| 6,000,980 A * | 12/1999 | Baldi et al. | 455/24 |
| 6,097,138 A * | 8/2000 | Nakamoto | 313/309 |
| 6,250,984 B1 | 6/2001 | Jin et al. | 455/51 |
| 6,283,812 B1 | 9/2001 | Jin et al. | |
| 6,333,598 B1 * | 12/2001 | Hsu et al. | 313/495 |
| 6,440,761 B1 | 8/2002 | Choi | |
| 6,440,763 B1 | 8/2002 | Hsu | |
| 6,448,701 B1 * | 9/2002 | Hsu | 313/309 |
| 6,504,292 B1 | 1/2003 | Choi et al. | |
| 6,515,415 B1 | 2/2003 | Han et al. | |
| 6,525,461 B1 * | 2/2003 | Iwasaki et al. | 313/495 |
| 6,538,367 B1 * | 3/2003 | Choi et al. | 313/309 |
| 6,635,983 B1 * | 10/2003 | Raina et al. | 313/495 |
| 6,664,727 B2 | 12/2003 | Nakamoto | |
| 6,670,629 B1 * | 12/2003 | Wilson | 257/10 |

(Continued)

FOREIGN PATENT DOCUMENTS

KR        2002031819        5/2002

(Continued)

OTHER PUBLICATIONS

Office Action from U.S. Appl. No. 11/467,876 dated May 18, 2007.

(Continued)

*Primary Examiner*—Jerome Jackson
*Assistant Examiner*—Paul Budd

(57) ABSTRACT

An electron source include a first cathode electrode disposed over a substrate and terminated to provide electrons; an emitter layer disposed over the cathode electrode and formed from one or plurality vertically aligned and mono-dispersed nano-structures that are truncated to the same length, embedded in a solid matrix and protruding above the surface for emitting electrons; an insulator disposed over the emitter layer and having one or plurality of apertures, each is self-aligned with and exposes one nano-structure in the emitter layer; and a second gate electrode disposed over the insulator, having one or plurality of apertures self-aligned with the apertures in the insulator and terminated to extract electrons from the exposed nano-structures through the apertures. The gate aperture is substantially less than one micrometer and the gated nano-structures can have a density on the order of $10^8/cm^2$. Such an electron source can be modulated with an extra low voltage, emits electrons with high current density and high uniformity, and operates with high energy-efficiency and long lifetime.

32 Claims, 9 Drawing Sheets

U.S. PATENT DOCUMENTS

| | | | |
|---|---|---|---|
| 6,692,324 | B2 | 2/2004 | Simpson et al. ............... 445/24 |
| 6,713,947 | B2 | 3/2004 | Hirasawa et al. |
| 6,741,019 | B1 | 5/2004 | Eilas et al. ................... 313/355 |
| 6,770,353 | B1 | 8/2004 | Mardilovich et al. |
| 6,774,548 | B2* | 8/2004 | Fran et al. ................... 313/309 |
| 6,812,480 | B2* | 11/2004 | Lee et al. ..................... 257/10 |
| 6,858,455 | B2 | 2/2005 | Guillom et al. ............... 438/20 |
| 6,858,521 | B2* | 2/2005 | Jin .............................. 438/551 |
| 6,864,162 | B2 | 3/2005 | Jin .............................. 438/551 |
| 6,935,915 | B2* | 8/2005 | Park et al. ..................... 445/24 |
| 7,095,040 | B2 | 8/2006 | Iwasaki et al. |
| 7,105,596 | B2 | 9/2006 | Smalley et al. |
| 7,205,069 | B2 | 4/2007 | Smalley et al. |
| 2002/0060514 | A1 | 5/2002 | Nakamoto |
| 2002/0076846 | A1* | 6/2002 | Ihm .............................. 438/34 |
| 2002/0094438 | A1 | 7/2002 | Gates et al. |
| 2002/0169235 | A1 | 11/2002 | West et al. |
| 2002/0172820 | A1* | 11/2002 | Majumdar et al. ........... 428/357 |
| 2002/0175323 | A1 | 11/2002 | Guillorn et al. ............... 257/10 |
| 2002/0175408 | A1 | 11/2002 | Majumdar et al. |
| 2003/0001490 | A1 | 1/2003 | Yamamoto et al. |
| 2003/0030356 | A1* | 2/2003 | Fran et al. ................... 313/310 |
| 2003/0097976 | A1 | 5/2003 | Zehnder et al. |
| 2003/0102797 | A1 | 6/2003 | Kajiwara |
| 2003/0122467 | A1 | 7/2003 | Cho et al. |
| 2003/0127960 | A1 | 7/2003 | Jeong et al. |
| 2003/0143788 | A1* | 7/2003 | Chen et al. ................... 438/169 |
| 2004/0036401 | A1* | 2/2004 | Konuma et al. ............. 313/311 |
| 2004/0157449 | A1* | 8/2004 | Hidaka et al. ............... 438/689 |
| 2004/0173506 | A1 | 9/2004 | Doktycz et al. |
| 2005/0067935 | A1* | 3/2005 | Lee et al. ..................... 313/309 |
| 2005/0079659 | A1* | 4/2005 | Duan et al. ................... 438/197 |
| 2006/0021564 | A1 | 2/2006 | Norman et al. |

OTHER PUBLICATIONS

Office Action from U.S. Appl. No. 11-467,880 dated May 17, 2007.

Bonard et al., Aug. 17, 1998, "Field Emission from Single-Wall Carbon Nanotube films," Appl. Phys. Lett. 73(7):918-20.

Chhowalla et al., Nov. 15, 2001, "Growth Process Conditions of Vertically Aligned Carbon Nanotubes Using Plasma Enhanced Chemical Vapor Deposition," J. Appl. Phys. 90(10):5308-17.

Dean et al., Nov. 8, 1999, "The Environmental Stability of Field Emission from Single-Walled Carbon Nanotubes," Appl. Phys. Lett. 75(19):3017-19.

Fowler et al., Mar. 31, 1928, "Electron Emission in Intense Electric Fields," Proc. Royal Soc. London A119:173-81.

Geis et al., 1997, "Theory and Experimental Results of a New Diamond Surface-Emmision Cathode," Lincoln Lab. J. 10(1):3-18.

Guillorn et al., Nov. 19, 2001, "Operation of a Gated Field Emitter using an Individual Carbon Nanofiber Cathode," Appl. Phys. Lett. 79(21):3506-08.

Li et al., jul. 19, 1999, "Highly-Ordered Carbon Nanotube Arrays for Electronics Applications," Appl. Phys. Lett. 75(3):367-69.

Mayer et al., 2002, "Theoretical Comparison Between Field Emission from Single-Wall and Multi-Wall carbon Nanotubes," Phys. Rev. B 65:155420.1-155420.6

Nilsson et al., Apr. 10, 2000, "Scanning Field Emission from Patterned Carbon Nanotube Films," Appl. Phys. Lett. 76(15):2071-73.

Read et al., 2001, "Carbon Nanotube-Based Cathodes for Microwave Tubes," Proc. of the 2001 Particle Accelerator Conference, IEEE Conf. Abstr.: 1026-28.

Ren et al. Nov. 6, 1998, "Synthesis of Large Arrays of Well-Aligned Carbon Nanotubes on Glass," Science 282:1105-07.

Rinzler et al., Sep. 15, 1995, "Unraveling Nanotubes: Field Emission from an Atomic Wire," Science 269: 1550-53.

Saito et al., Oct. 1, 1997, "Field Emission Patterns from Single-Walled Carbon Nanotubes," Jpn. J. App. Phys. Part 2, 36(10A):L1340-42.

Wang et al., Feb. 26, 2001, "Flat Panel Display Prototype Using Gated Carbon Nanotube Field Emitters," Appl. Phys. Lett. 78(9):1294-96.

Office Action from U.S. Appl. No. 10/467,876 dated Jan. 25, 2008.

USPTO Office Action Jan. 25, 2008, regarding U.S. Appl. No. 11/467,876.

* cited by examiner

LOW VOLTAGE ELECTRON SOURCE WITH SELF ALIGNED GATE APERTURES, AND LUMINOUS DISPLAY USING THE ELECTRON SOURCE

The present application is related to pending U.S. application Ser. No, 10/807,890.

BACKGROUND OF INVENTION

The present invention relates to an emission electron source using nano-structures as emitters and self-aligned and nano-sized gate aperture for low voltage control, the fabrication method thereof and its use in flat panel display.

There has been broad interest in the field emission application of nano-structured materials because of their inherited high aspect ratio. Among various materials, Carbon nanotube (CNT) appears the most promising. Numerous studies have reported the advantageous emission properties of CNT. It has a threshold field as low as 1 to $2 \times 10^6$ V/m, a low electron energy spread, and can carry a current as high as 500 nA (nano-Amperes) per tube. Its extraordinary high electrical and thermal conductivity as well as strong chemical and mechanical stability make it an ideal field emitter.

Potential applications of a CNT field emission device include flat panel displays, 2D sensors, direct writing e-beam lithography, microwave amplifiers, x-ray generator, electron microscopy, as well as various other instrumentations. However, all of these applications demand the device to meet part or all of the following requirements: 1) ability to modulate electron emission at a low voltage, ideally, less than 10V; 2) high emission current density; 3) high emission uniformity over large area; 4) high energy efficiency; 5) resistance to ion bombardment; 6) chemical and mechanical robustness; 7) generation of collimated electron beam. The importance of the ability to modulate a source at low voltage can hardly be over stressed. The cost of a device driver, which often is a major cost component, power consumption, as well as device miniaturization are all depend on the modulation voltage. To achieve low voltage emission modulation, a gate electrode has to be fabricated in the vicinity of the emitter to control the emission. To modulate emission at a voltage less than 10 V, this distance has to be close to one micrometer or less. High emission current density and high emission uniformity requires a high emission site density and high emission homogeneity between the sites. For display applications, for example, a minimum emission site density of $10^6/cm^2$ (equivalent to 25 emitters in a 50 μm×50 μm pixel) is required. High energy-efficiency requires both a low gate current and a low modulation voltage. For a field emission device of a meaningful lifetime and stable electron emission, the emitter material as well as device structure have to be chosen in order that the emitter is able to sustain ion bombardment and chemical erosion from active species in the device operating environment.

Despite the superior emission properties of a single CNT, the current state of the art of a CNT electron source does not meet most of the above requirements and, therefore, has not found any product applications yet, despite the appearance of some prototype flat panel displays. The major challenges and problems include:

a) Insufficient Growth Control in CNT Length, Diameter and Spacing Between them

CNT tends to grow in a wide range of length on the same sample even in a small proximity. As a result, each CNT will have a different aspect ratio and a different distance from the gate electrode, should an integrated gate electrode be built. Those CNTs with a higher aspect ratio and proximity closer to the gate will experience a stronger extraction field and, therefore, emit electrons first and with a higher current density, and in the end, burn out faster. CNT growth requires a catalyst. The diameter and spacing between CNTs is determined by the catalyst size and spacing. With a continuous layer of catalyst, or gas phase catalytic doping, CNT grow densely, causing electrostatic screening effect between neighboring CNTs. The result is an array of highly oriented and densely packed CNT, which will hardly emit electrons. The diameter of the CNT is also random, again causing variation in aspect ratio. In prior art, the spacing between CNTs is controlled by patterning catalyst into array of dots before the CNT growth using either e-beam lithography or a mono-layer of nano polymer beads as a mask for the catalyst deposition. Both methods are difficult to implement in production. E-beam lithography is so slow and expensive that it is ill suited for any meaningful operation. Applying a mono-layer consistently over large an area is no easy task.

b) Difficulty in Fabrication of an Integrated Gate Structure

Two obstacles make the fabrication difficult. First, CNT films is sensitive to wet processes. Upon exposure to a wet agent, CNTs either stick to the substrate or to themselves, diminishing their field emission properties. Second, the gate aperture has to be aligned with CNT.

In one of prior art, shown in FIG. 1A, the gate electrode is replaced by a metallic grid mechanically mounted atop of a randomly grown CNT film. Emission modulation using such a grid typically requires a voltage on the order of 1 kV.

In another prior art, shown in FIG. 1B, a gate structure is pre-fabricated using either conventional micro-fabrication or thick film technology. CNTs are then either grown into the gate hole without further processing or screen printed into the gate holes respectively. The problem is that a group of densely grown CNTs in a single gate hole does not emit well because of the strong electrostatic effect amongst them and the variation in their length and aspect ratio. CNTs mixed with other chemicals to facilitate screen-printing into gate hole do not perform well either. In addition, deposition of CNT into the gate hole often cause short circuit between the gate and the cathode electrode, resulting in low production yield.

In a third prior art, shown in FIG. 1C, vertically oriented and mono-dispersed CNT is grown before gate fabrication and the gate aperture is self-aligned with a diameter of at least 2 micrometers. The spacing between CNTs has to be controlled to at least 5 micrometers so that there will be only one CNT in each gate hole. To achieve such a growth, e-beam lithography was used to pattern the catalyst into an array of dots with desirable spacing and dot size, even though the fabrication of a self-aligned gate aperture does not require lithography.

c) High Modulation Voltage

The diameter of a typical gate aperture fabricated by prior art is typically a few micrometers, while the one fabricated by thick film process can have diameters on the order of tens of micrometers. Therefore, emission modulation voltage for these integrally gated source will be tens to hundreds of volts. For display application, these high modulation voltages are impractical, since conventional CMOS display drivers will not be able to deliver it.

d) Low Emission Site Density

The best performing field emission films today are those randomly grown CNT without exposing further processing. Typically, they have an emission site density on the order of $5\times10^5/cm^2$. For an integrally gated structure, where CNTs are grown or printed in a pre-made gate aperture, there exist large variations among the CNTs, both within the same gate hole as well as from gate hole to gate hole. These variations both in length (thus tip-to-gate distance) and aspect ratio will cause emission to be dominated by those few emitters that experience the highest local electrical field. The diameter of the each gate aperture, which is at best a few micrometers, also puts a limit on the emission site density.

e) Inhomogeneous Emission

The variation in length, diameter and spacing between CNTs discussed above will cause some emitters emit electrons easier. In a display, these dominating sites appear as bright spots on the phosphor screen. And due to higher current, these sites also burn out faster and, therefore, have a short lifetime.

f) Relatively Low Resistance to Ion Bombardment and Erosion from Residual Oxygen Oxygen is one of the major residual gases in most field emission devices. Carbon reacts easily with oxygen, causing emitter erosion. Carbon is also relatively easy to be sputtered by ion bombardment. Accumulated redeposition of the sputtered Carbon can then causes short circuit between electrodes.

g) Highly Divergent Electron Beam

Since CNT tips tend to point to random direction, the generated electron beam is highly divergent.

h) Low Production Yield

Both growth and screen-printing of CNT into a prefabricated gate holes can often cause short circuit between cathode and gate electrodes. The strict requirements of high-resolution photolithography also contribute to lower production yield and high cost.

SUMMARY OF INVENTION

It is the objective of the current invention to: a) provide a method to fabricate a self-aligned gate aperture with a diameter on the order of 100 nanometer around each vertically oriented CNT and with equal distance to each CNT; b) provide a method for controlling CNT growth over large area so that they are mono-dispersed, with a narrow distribution in diameter, and, furthermore, the spacing between them is large enough to enable a gate aperture around each CNT and yet small enough in order that the emitter density can be as high as $10^8/cm^2$; and c) provide a means for enabling favorable wide band gap semiconductor nano-structures to be utilized as field emitters.

It is another object of the invention to provide an electron source using a vertically oriented and mono-dispersed nano-structures that: a) has emission properties which can be modulated with a low voltage, b) has a high emission site density, c) emits uniformly over large area, d) generate a highly collimated electron beam, e) has high energy efficiency, f) is robust to ion bombardment and chemical attack, and g) is easy to fabricate with high production yield.

It is the third objective of the invention to provide a display using the above electron source.

To achieve the first objective, one or array of vertically oriented CNT of an average length of one or a few micrometer is grown or assembled onto a first conductive layer (cathode electrode) extending over a substrate. A dielectric is then deposited to completely or mostly embed the CNT. Chemical mechanical planarization (CMP) is then performed to truncate the CNT, equalizing the length of each CNT in the array. An etch-back of the embedding dielectric is further applied to allow the CNTs to protrude above the surface. The length of the protruding portion of the CNT is substantially less than one micrometer and is preferably less than 200 nm. A second conformal insulator layer is then deposited with a thickness about 100 nm or less, such that one or array of posts forms from the protruding CNT. A second conductive layer for a gate electrode is further deposited over the insulator. The gate metal and the second insulator are then removed by several methods, as is explained in details in the later section of the disclosure, from the nano-structures, leaving a self-aligned aperture in the gate electrode and the insulator around each CNT. Each gate aperture is spaced from the exposed CNT by a distance equal to the thickness of the insulator.

Self-alignment of an aperture on the order of 100 nm in diameter, as is described in the current invention, means the location where the vertically oriented CNT is grown or assembled can be random and needs not be predetermined. The spacing between CNTs, in this invention, may be as low as one micrometer or less. Therefore, two orders of magnitude higher emitter density over prior art is possible and advantages can be taken of CNT growth or assembly controlling processes that don't require expensive and complicated lithography.

One of such enabled embodiments is to use an ion-track-etched membrane as a hard mask for patterning catalyst before CNT growth. Preferred membranes are those with a pore density about $1\times10^8$ pores/cm$^2$ and pore sizes from 20 to 150 nm. It is known that for CNT growth, its diameter and the inter-tube spacing are determined by those of catalyst, provided the catalyst size is less than 200 nm. Catalyst deposition through an ion-track-etched membrane with chosen pore size and density will produce an array of catalyst dots with substantially uniform size and desirable inter-tube spacing.

The advantages of using the ion-track-etched membranes as a shadow mask for catalyst deposition include: a) pore size and density are in the most desirable range and are highly controlled, b) inexpensive, widely available, and come in sizes particularly suitable for large flat panel display applications, and c) it is easy to apply them to a substrate surface as a shadow mask and they can be recycled in production, provided the catalyst is removed after each deposition.

Throughout the discussion above, CNT is used as the emitter. However, according to the current invention, the emitter does not have to be CNT. Any conductive nano-structure with high melting pointing and high mechanical and chemical stability can directly replace the CNT. Furthermore, nano-structures of non-conductive materials, particular those of wide band gap semiconductor, such as BN nanotube, and nanowires of AlN, AlGaN, SiC, and GaN can be utilized. Wide band gap semiconductor materials have the most desirable electronic, chemical, mechanical and thermal properties for field emitter, except that they are not conductive. According to the current invention, the problem can be solved by conformally coating these nano-structures with a thin layer of conductive material before the deposition of the embedding dielectric. Or, a conductive material can be used for the entire embedding material. The conductive coating on the non-conductive nano-structure, or the conductive embedding material, will serve to transport electrons from the cathode to or near the tip of the nano-structure.

The completed structure, as is described above, forms an electron source. It comprises of: a first cathode electrode disposed over a substrate, the cathode electrode for providing a source of electrons; an emitter layer being deposed over the cathode electrode and formed from a composition of a embedding material and one or an array of vertically oriented and mono-dispersed nano-structures embedded therein, the emitter layer having a surface parallel to which the nano-structures are truncated to the same length, and above the surface the nano-structures protrude by a small fraction of one micrometer; a gate insulator of a thickness on the order of 100 nm being disposed over the emitter layer and having one or array of apertures aligned with and exposes each nano-structure in the emitter layer; and a gate electrode deposed over the gate insulator and having apertures aligned with each of those in the insulator and spaced from the exposed nano-structure by a distance equal to the thickness of the insulator, the gate electrode for controlling the emission of electrons through the apertures from the exposed nano-structures.

One embodiment of the invention comprises an emission electron source that includes a cathode electrode, an emitter layer, an insulator and a gate electrode. The cathode electrode is disposed on a substrate and provides a source of electrons. The emitter layer is disposed over the cathode electrode and is formed from a composition of non-porous embedding material and one or a plurality of non-structures embedded therein. The embedding material has a surface above which portions of the nano-structures protrude to emit electrons. The insulator is disposed over the emitter layer and has one or a plurality of apertures, each exposing at least the ends of the nano-structures in the emitter layer. The gate electrode is disposed over the insulator and has one or a plurality of apertures. Each aperture exposes a signle nano-structure and is concentrically self-aligned with the end of the nano-structure. The gate electrode is operative to control the emission of electodes through the apertures from the exposed nano-structures. In the embodiment, the nano-structures comprise a nonconductive core and a conductive shell.

In another embodiment the insulator and the embedding material are composed of the same dielectric material.

Another embodiment of the present invention comprises a display that includes an electron source and an anode plate. The electron source includes a cathode electrode, an emitter layer, an insulator, and a gate electrode. The cathode electrode is disposed on a substrate and provides a source of electrons. The emitter layer is disposed over the cathode electrode and is formed from a composition of non-porous embedding material and one or a plurality of non-structures embedded therein. The embedding material has a surface above which portions of the nano-structures protrude to emit electrons. The insulator is disposed over the emitter layer and has one or a plurality of apertures, each exposing at least the ends of the nano-structures in the emitter layer. The gate electrode is disposed over the insulator and has one or a plurality of apertures. Each aperture exposes a single nano-structure and is concentrically self-aligned with the end of the nano-structure. The gate electrode is operative to control the emission of electrons through the apertures from the exposed nano-structures. The anode plate includes a transparent anode electrode that is disposed over a glass substrate and a phosphor screen disposed over the anode electrode. The anode plate is positioned opposite to the electron source with a vacumn gap disposed therebetween. The electrons are emitted from the nano-structures by apply a voltage between the cathode and the gate electrodes, and are made incident on the phosphor screen to make the screen luminous.

The electron source as is described above become addressable when: the first cathode electrode is configured as multiple cathode electrodes each electrically isolated from each other; the gate electrode is configured as multiple gate electrodes, each electrically isolated from each other and intersects with the multiple cathode electrodes; and apertures are formed at the intersection in the gate electrode and the insulator, each exposes and is aligned with one nano-structure from the emitter layer. Activation of a selected cathode and a selected gate electrode will determine one intersection that emits electrons.

In accordance with the current invention, the gate aperture will always be perfectly aligned with the emitter, and the distance between aperture and its emitter will be substantially the same over the entire substrate surface, on the order of 100 nm, and controllable by the thickness of the gate insulator. And, all the emitters have substantially the same length and diameter. A gated field emission electron source with these characteristics provides an extra low voltage modulation, uniform emission over large area, and low energy loss from gate current, Since the emitter is largely embedded in a dielectric, it is mechanically and chemically protected and, to some extent, shielded from ion bombardment, giving rise to a longer lifetime and steadier electron emission. With a proper selection, the embedding material can also enhance the thermal conduction from the emitter. When a dielectric is used as the embedding material, the relatively large gap between the cathode and the gate electrodes also reduces the occurrence of a short circuit between them and the capacitive energy consumption during the emission modulation, resulting in a higher production yield and higher energy efficiency. An array of emitters with a density as high as $10^8/cm^2$ will produce a more homogeneous emission compared to those of low emitter density.

A display or a lighting device is formed, when the electron source is positioned opposed to and with a vacuum gap from a third anode electrode on which a phosphor screen is deposited. Electrons generated from the emitter by an applied voltage between the cathode and gate electrodes are made incident on the phosphor screen by another positive voltage applied to the anode electrode. Light is generated when the electrons strike the phosphor screen. When a transparent anode electrode is used and it is deposited on a transparent glass substrate, the generated light becomes visible from outside of the device.

The display device described above become fully addressable, when: the cathode electrode is configured as array of strip-like cathode electrodes extending substantially in the same direction and to be spaced and electrically insulated from each other at intervals in the transverse direction; the gate electrode is configured as array of strip-like gate electrodes extending in the direction that intersect with the cathode electrodes and to be spaced and electrically insulated from each other at intervals in the transverse direction; one or an array of apertures are formed in the gate electrode and the gate insulator at intersections, each aligned with and exposes one nano-structure in the emitter layer; and the anode electrode is configured as an array of strip-like anode electrodes, each extending opposed to a corresponding gate electrodes. The intersection forms a pixel region corresponding to one pixel of a display.

BRIEF DESCRIPTION OF DRAWINGS

The accompanying drawings, which are incorporated in and form a part of this specification, illustrate embodiments of the invention and, together with the description, serve to explain the principles of the invention:

FIG. 1A shows a grid gated electron source using carbon thin film or CNT as emitter;

FIG. 1B shows an integrally gated emission electron source with multiple CNT in one aperture; and FIG. 1C shows an integrally gated field emitter with one vertically oriented CNT in each aperture and an aperture diameter larger than 2 micrometers;

FIG. 2A shows a section view from the front;

FIG. 2B shows the top view.

FIG. 3A shows a substrate;

FIG. 3B shows the deposition of cathode electrode on the substrate;

FIG. 3C shows the deposition and patterning of catalyst on the cathode;

FIG. 3D shows the growth of a vertically oriented CNT from each catalyst dot;

FIG. 3E shows the deposition of a conformal embedding dielectric over the CNT;

FIG. 3F shows the truncation of CNT by polishing;

FIG. 3G shows the formation of an emitter layer by a slight etch back of the embedding dielectric after CNT truncation;

FIG. 3H shows the conformal deposition of a gate insulator, and a line-of-sight deposition of a metal layer for the gate electrode;

FIG. 3I shows the formation of self-aligned gate aperture around each CNT after the removal of the gate insulator and the gate metal from the protruding CNT.

FIG. 4A shows the section view after the deposition of a second dielectric and the gate electrode;

FIG. 4B shows the formation of the self-aligned gate aperture around each CNT after CMP and a slight etch back.

FIG. 5A illustrates how to form a self-aligned photo resist mask after the deposition of a second dielectric and the gate electrode;

FIG. 5B shows the top view after the formation of a self-aligned resist mask;

FIG. 5C shows the formation of self-aligned gate aperture around each CNT by using self-aligned resist mask to remove the gate metal and insulator on CNT.

Reference designators used herein are: 20 CNT, 22—non-conductive nano-structure, 24 conductive coating on a non-conductive nano-structure, 30 the first electrode, 32 the second electrode, 34 gate aperture, 36 gate insulator, 40 substrate, 42 anode with phosphor screen, 50 catalyst, 52 an embedding dielectric material, 56 post, 58—photo resist, 60 UV illumination, 70 vacuum space between electron source and anode, 100 emitter layer, 200 electron source, 300 addressable electron source, 400 anode plate, 500 display.

DETAILED DESCRIPTION

Figure 1A:
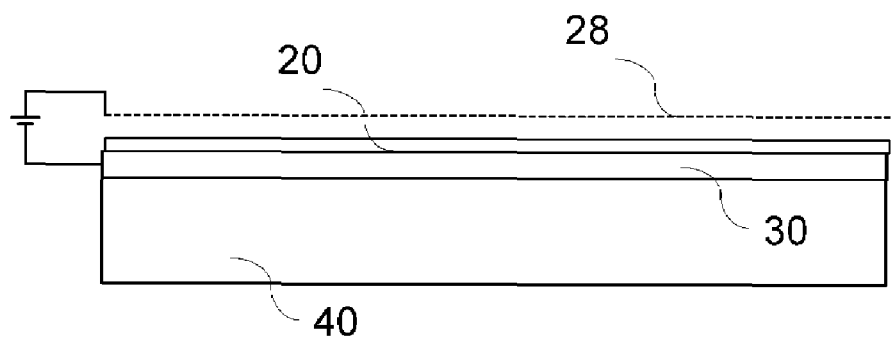
FIG. 1A through FIG. 1C are schematic illustrations of various prior electron source configurations.
Figure 1B:
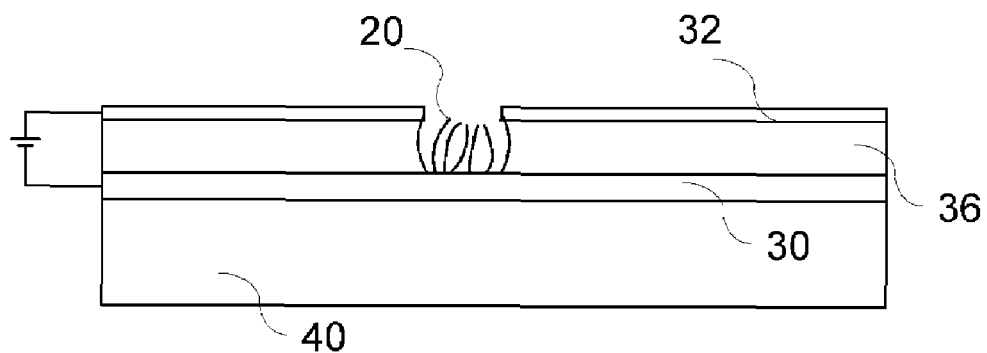
Figure 1C:
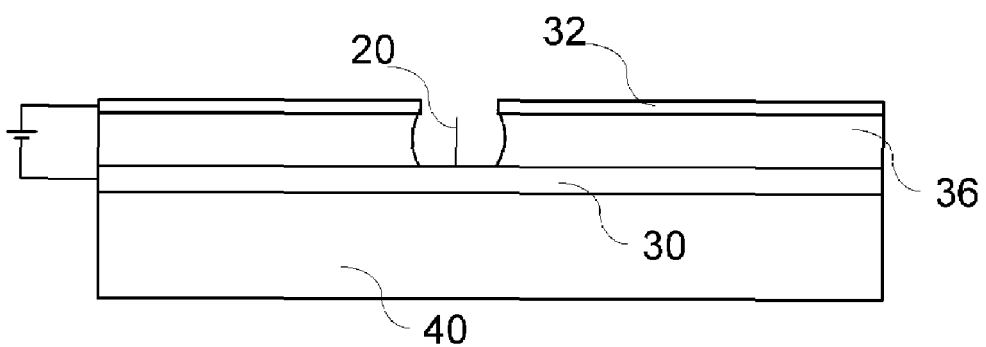
Figure 2:
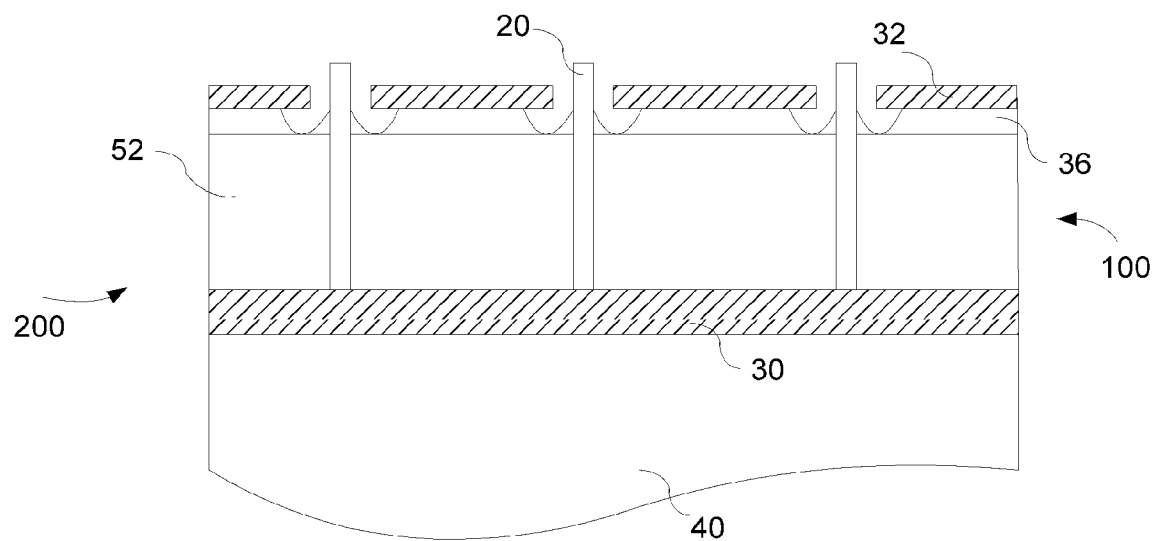
FIG. 2A-FIG. 2B show an electron source according to current invention.
Figure 2:
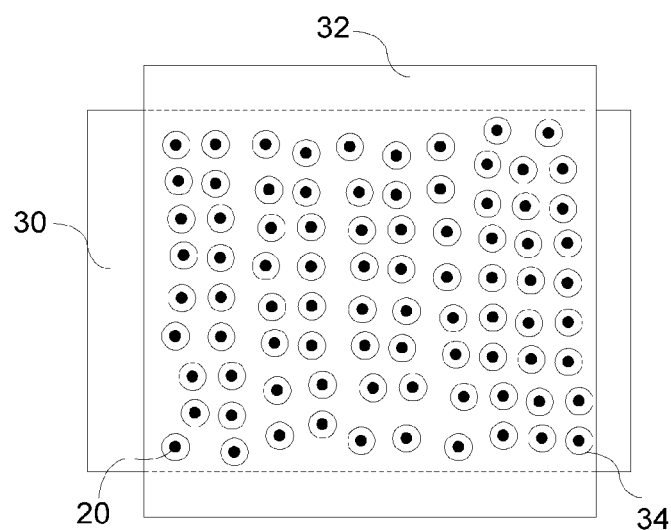

FIG. 2 illustrates an electron source 200 by current invention using vertically aligned and mono-dispersed CNT 20 as emitter. It includes a cathode electrode 30 deposited on a substrate 40; an emitter layer 100 disposed over the cathode and formed from an embedding dielectric 52 and an array of CNTs embedded therein, the emitter layer having a surface parallel to which the CNTs have been truncated to the same length, and above the surface the CNTs protrude by a small fraction of one micrometer; a gate insulator 36 disposed over the emitter layer of a thickness on the order of 100 nm and having an array of apertures, each aligned with and exposes one nano-structure in the emitter layer; and a gate electrode 32 deposited on the gate insulator and having an array of apertures 34 aligned with the apertures in the insulator and spaced from the exposed CNT by approximately the thickness of the insulator. When a positive voltage is applied between the gate and the cathode electrodes, the gate apertures extract electrons from the CNTs.

Figure 3:
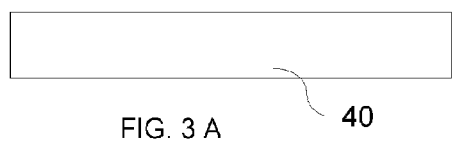
FIG. 3A through FIG. 3I illustrate the fabrication steps of the first embodiment of the current invention.
Figure 3:
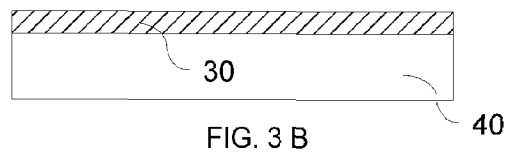
Figure 3:
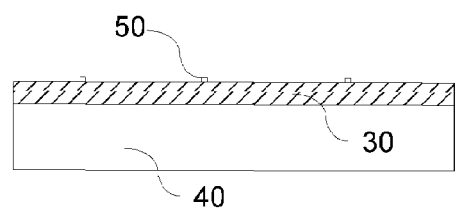
Figure 3:
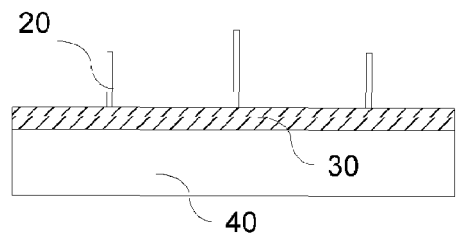
Figure 3:
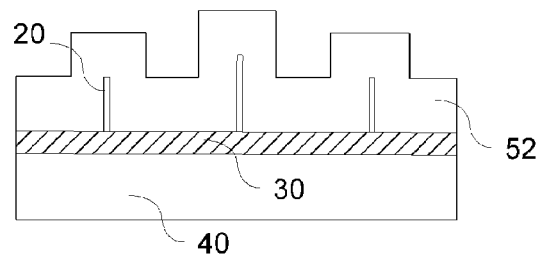
Figure 3:
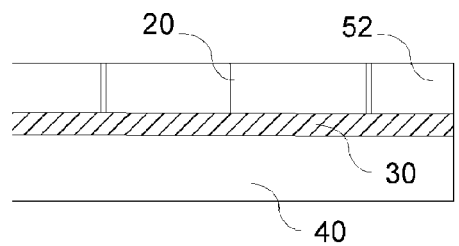
Figure 3:
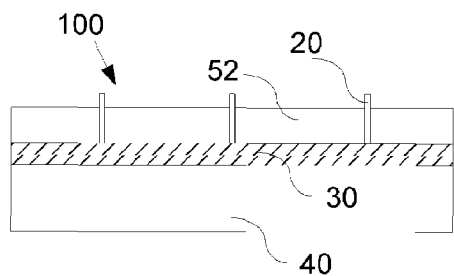
Figure 3:
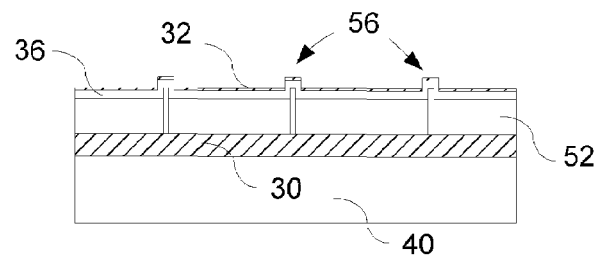
Figure 3:
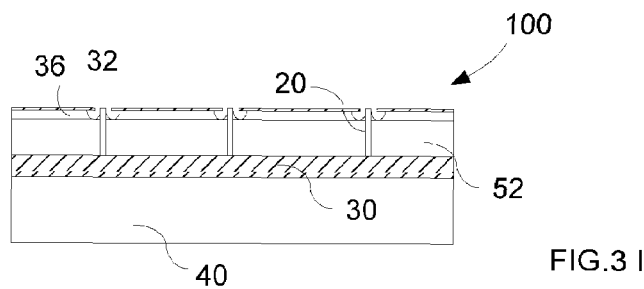

FIG. 3 depicts one of the possible fabrication process flows for the source shown in FIG. 2. Starting with an insulating substrate 40, such as a Si wafer or a glass plate, shown in FIG. 3A, a cathode metal 30, Cr for example, is deposited on to the substrate, as is shown in FIG. 3B.

A patterned catalyst layer 50 of 3 nm thick is then deposited onto the cathode, as is shown in FIG. 3C. The catalyst, Ni for example, can be deposited by thermal or e-beam evaporation, or electrochemical plating through an ion-track-etched membrane laid on top of the substrate. After the deposition, the Ni forms an array of dots on the cathode metal of a diameter and a surface density of 30 nm and $10^8/cm^2$ respectively, for instance. Vertically aligned CNT 20 is then grown by one of the known techniques, such as plasma enhanced chemical vapor deposition (PECVD), with one CNT grown from one catalyst dot, as is shown in FIG. 3D. Since the diameter of the catalyst dots has a narrow distribution, the grown CNTs in the array are expected to have a consistent diameter. A dielectric 52, Silicon Oxide $SiO_2$, for example, is then conformally deposited until it completely or almost completely embeds the CNT, shown in FIG. 3E. A chemical mechanical planarization (CMP) process is then applied to the surface to truncate all the CNT to the same length and obtain a flat surface, shown in FIG. 3F. A slight etch back of the embedding oxide is then performed so that ends of the truncated CNTs protrude from the surface for about 150 nm, forming an emitter layer 100, as is shown in FIG. 3G. A conformal coating of a gate insulator 36, such as $SiO_2$ again, is then applied to the surface with a thickness on the order of 100 nm, 75 nm for example, forming an array of posts 56 from the CNT. A line-of-sight deposition of a gate metal 32 of a thickness less than that of the gate insulator, 35 nm for example, is then followed for the gate electrode. As is shown in FIG. 3H, the line-of-sight deposition by, for example, e-beam evaporation will deposit the gate metal only on the top of the posts and the floor surface at the bottom of the post. An insulator etch is then performed to remove the coating on the CNTs and, at the same time, lift off the gate metal on the post, leaving a gate aperture 34 and a corresponding insulator aperture around each CNT, as is shown in FIG. 3I. As a result, an electron source with a perfectly aligned gate aperture, a gate to emitter distance less than 100 nm and an emitter density of $10^8/cm^2$ is completed without using any expensive and complicated lithography processes. Here $SiO_2$ has been used for both the embedding dielectric and the gate insulator. However, a second dielectric material different from that of the embedding dielectric can also be used for the gate insulator.

Figure 4:
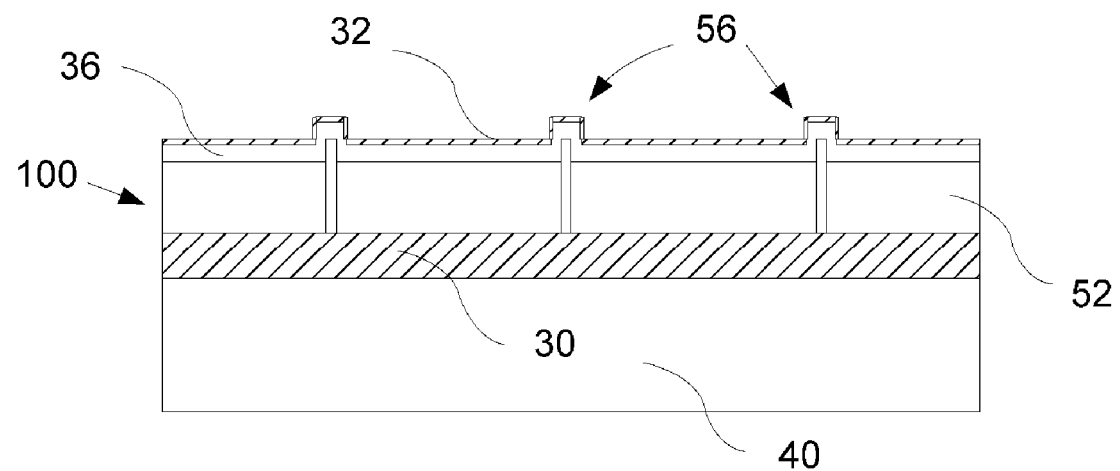
FIG. 4A and FIG. 4B show the formation of self aligned gate aperture by CMP.
Figure 4:
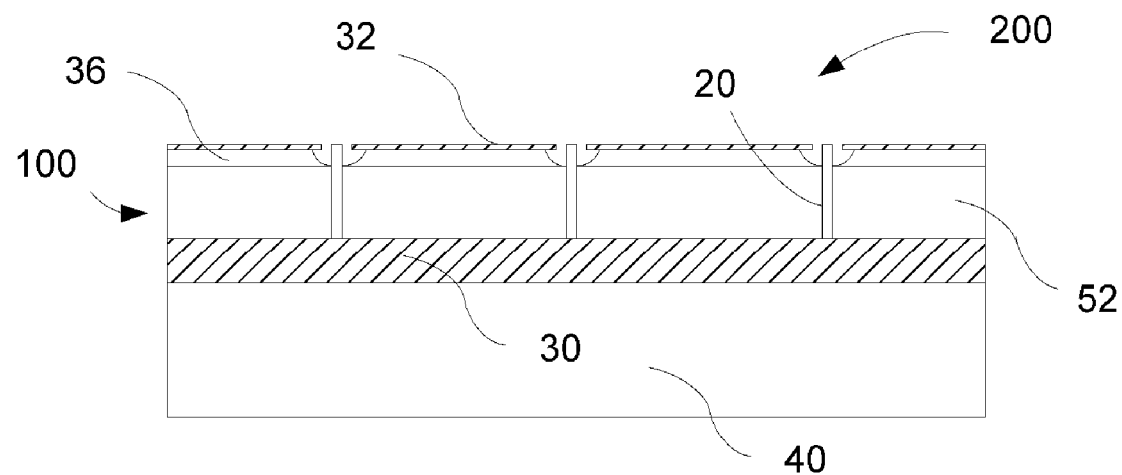

FIG. 4 shows an alternative way of fabricating the self-aligned gate aperture in accordance with the current invention. Repeating the steps described above until the deposition of the gate metal as is shown in FIG. 4A. Here the gate metal does not have to be thinner than the conformal insulator layer and it does not have to be deposited by a line-of sight process either. When a CMP is then applied to remove the posts 56 and stop at the gate metal on the floor surface, an aligned gate aperture around each of the CNTs automatically forms. A slight etch back of the gate insulator is then applied, farming aligned apertures in the insulator to further expose the protruding portion of the CNTs in the emitter layer for emitting electrons, as is shown in FIG. 4B.

Figure 5:
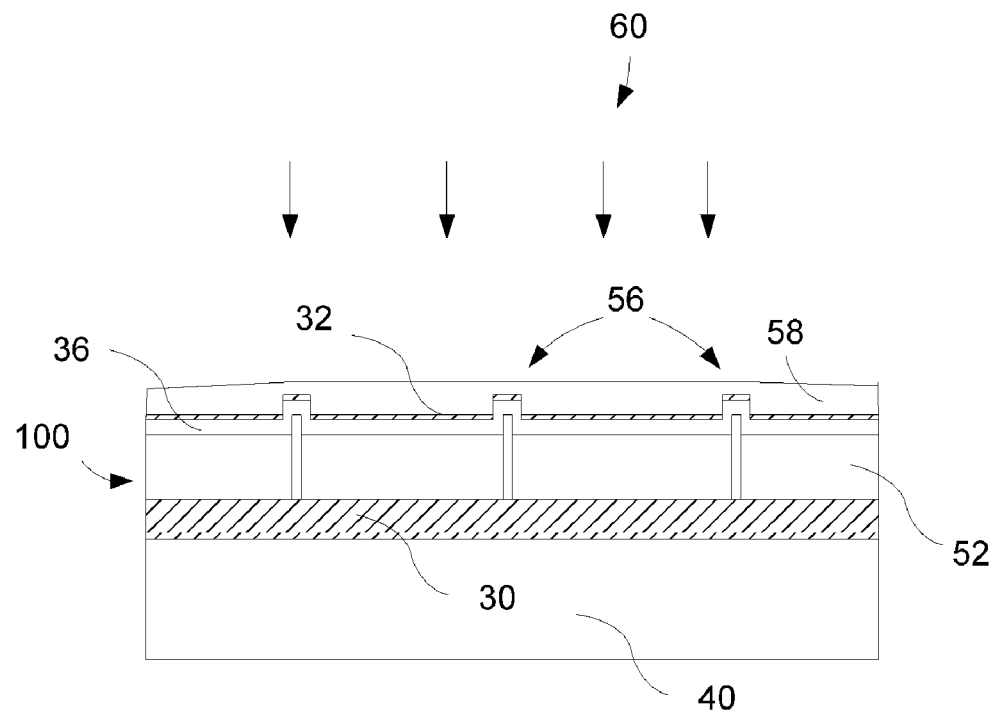
FIG. 5A through FIG. 5C show the formation of self aligned apertures by using photo resist as a etch mask.
Figure 5:
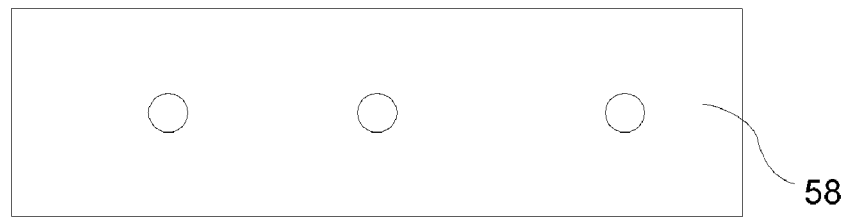
Figure 5:
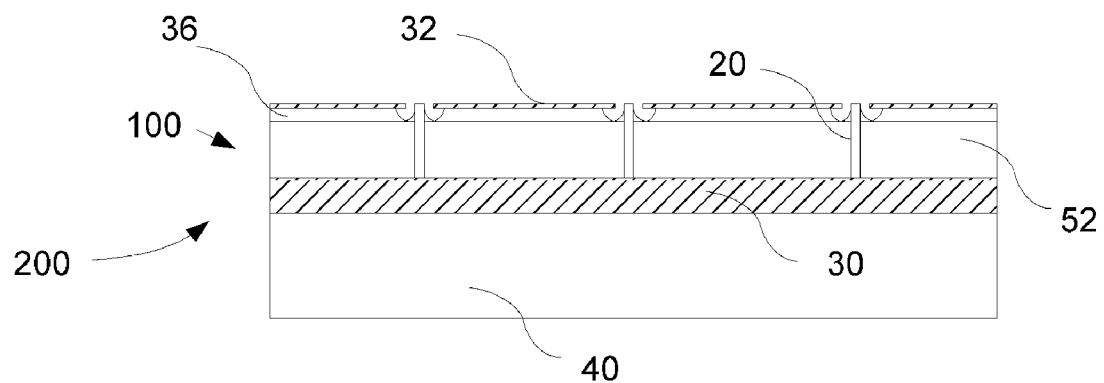

A third alternative is to coat the surface with a thick positive photo resist 58 after the deposition of the gate metal to planarize the surface, as is shown in FIG. 5A. The resist at the top of posts 56 will be substantially thinner than it is on the floor surface at the bottom of the posts. A global UV illumination 60 is then applied with a dosage chosen such that only the resist on top of the post will be dissolved after resist development, forming a mask with opening only on top of the posts, as is shown in FIG. 5B. The gate metal and insulator are then removed from the posts by chemical etches. Removal of the resist mask results in apertures in the gate metal and the insulator around each CNT.

It is obvious to the ones who are skilled in the field that the above described methods of fabricating a self-aligned and nano-sized apertures around a vertically oriented and mono-dispersed nano-structure is independent of the way how the nano-structures are introduced onto the cathode electrode. Alternatives of introducing the nano-structures onto the surface include at least: growing nano-structures using such templates as porous alumna or silica, or assembling pre-fabricated nano-structures onto the surface. In case of using a template for growth, the template itself can later serve as the embedding material.

Figure 6:
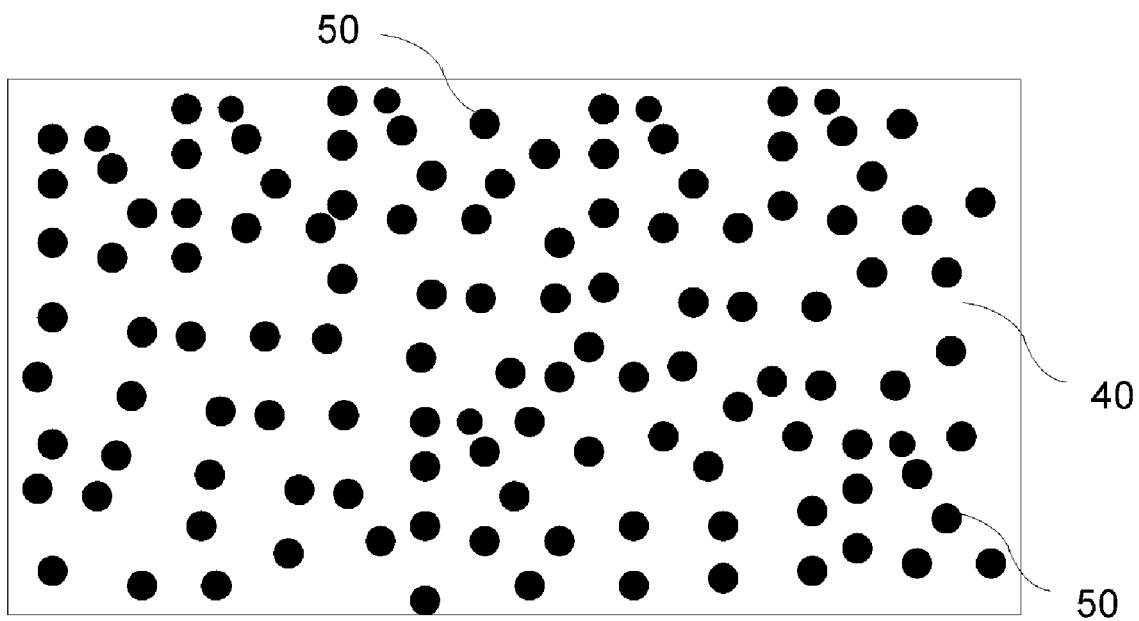
FIG. 6 shows a catalyst pattern formed using an ion-track-etched membrane as a mask.

FIG. 6 shows a pattern of catalyst dots 50 formed from a deposition through an ion-track-etched membrane. A membrane with a pore density of $10^8/cm^2$ will result in an array of CNT with an average spacing of one micrometer between them, which is sufficiently ample for a gated structure that the diameter of the aperture is only a small fraction of it. There is a wide selection range for these tack-etched membranes. Depending on applications, one could choose a membrane with a pore density anywhere between $10^5/cm^2$ and $5 \times 10^8/cm^2$, giving rise to an average spacing between 50 micrometers to 500 nm. As for pore size, only those with pores less than 300 nm should be used since a catalyst dot size larger than 300 nm will result in multiple CNT growth. The most common track-etched membranes are those of polycarbonate or polyester. To eliminate the outgasing of these plastics in a vacuum deposition chamber, one could use a membrane from other materials such as Cu or Al thin films. Using the track etched plastic membrane as an etch mask, one can easily transfer the pores size and distribution from the plastic film to that of other materials.

Figure 7:
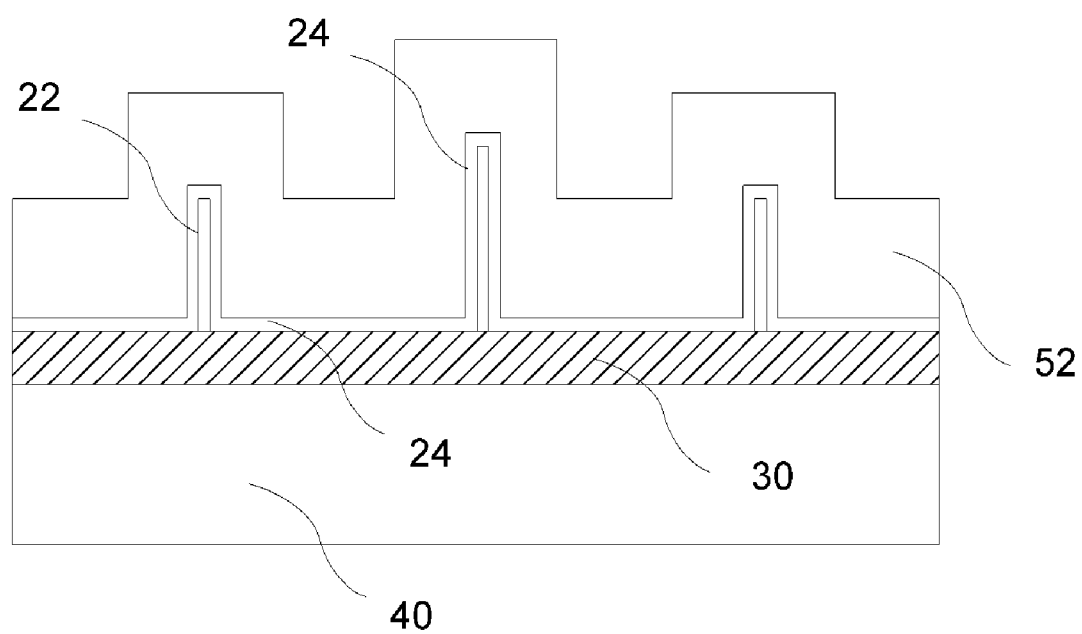
FIG. 7 shows the use of a non-conductive nano-structure as emitter and the conformal coating of a conductive layer prior to the deposition of a dielectric embedding material.

Nano-structures from many materials can be used to replace CNT in the current invention. Examples of conductive nano-structure alternatives include refractive metal or alloy nano-wires; conductive ceramics or conductive ceramic composite nano-wires; carbon fiber and carbon nano-cone; conductive nano-structures with a thin film coating for enhanced field emission, such as W nano-wire coated with nano-diamond, or diamond like carbon; and composite nano-structures with a non-conductive core and a conductive shell or vise versa. Examples of non-conductive nano-structures include: BN nanotube, nano-wires of AlN, AlGaN, GaN, SiC, ZnO and diamond. There are two ways to provide electrons transportation from the cathode to tip of the non-conductive nano-structures. FIG. 7 depicts one of them. A conductive coating 24 of a thickness of the diameter of nonconductive nano-structure 22 is applied before the deposition of an embedding dielectric. The nonconductive nano-structures are, therefore, converted to a composite with a non-conductive core and a conductive shell. Alternatively, a conductive material is used to embed the nano-structures. The most desirable conductive coating or embedding materials include conductive ceramics, conductive ceramic composites and refractive metals and alloys.

The use of different nano-structures as emitter may also require the choice of different catalyst to be used. For CNT, typical catalysts include: transition metals and their compounds, such as Ni, Co or Fe. Sometimes, a diffusion barrier, such as TiN, may have to be deposited first to prevent the catalyst from diffusing into the cathode electrode during CNT growth. For other nano-structures, one of the often-used catalysts is Au. However, selection of proper catalyst for a particular nano-structure growth should be obvious to those skilled in the field.

A ballast resist layer, such as cermet, can also be applied between the nano-structure and the cathode electrode to even out electron emission from different emitters.

Optionally, either the diffusion barrier or the ballast resistor layer can be deposited at the same time when the catalyst is deposited through the track-etched membrane.

Figure 8:
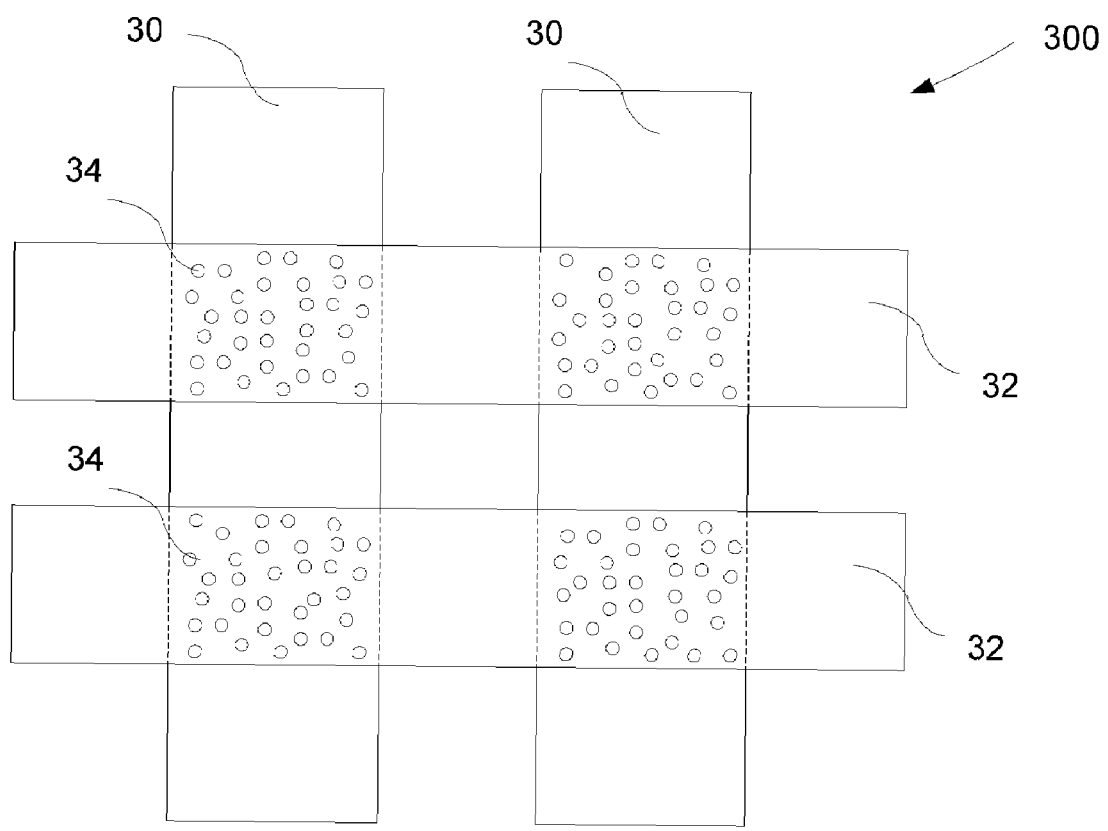
FIG. 8 shows a top view of an addressable electron source according to the current invention.

FIG. 8 schematically illustrates an addressable electron source 400 in accordance with the current invention. It includes: multiple electrically isolated cathode electrodes 30 extending on the substrate in one direction; an emitter layer disposed over the cathode electrodes and formed from an embedding material and multiple vertically aligned and mono-dispersed nano-structures embedded therein, the nano-structures are truncated to the same length, protrude above the surface of the emitter layer and are distributed in patches along the cathode electrodes, and the density of the structures in each patch is as high as $10^8/cm^2$; a gate insulator of a thickness less than 100 nm being deposed over the emitter layer and having apertures aligned with and exposes each nano-structure in the emitter layer; and multiple electrically isolated gate electrodes 32 disposed over the insulator and extending in the orthogonal direction to intersect with each cathode electrode at the location where the nano-structure patches are; and multiple apertures 34 in the gate electrodes at each intersection that are aligned with apertures in the insulator and are spaced from the exposed nano-structure by a distance equal to the thickness of the insulator. Activation of a selected cathode and a selected gate electrode determine the patch at the selected intersection, or the pixel, that emits electrons.

Figure 9:
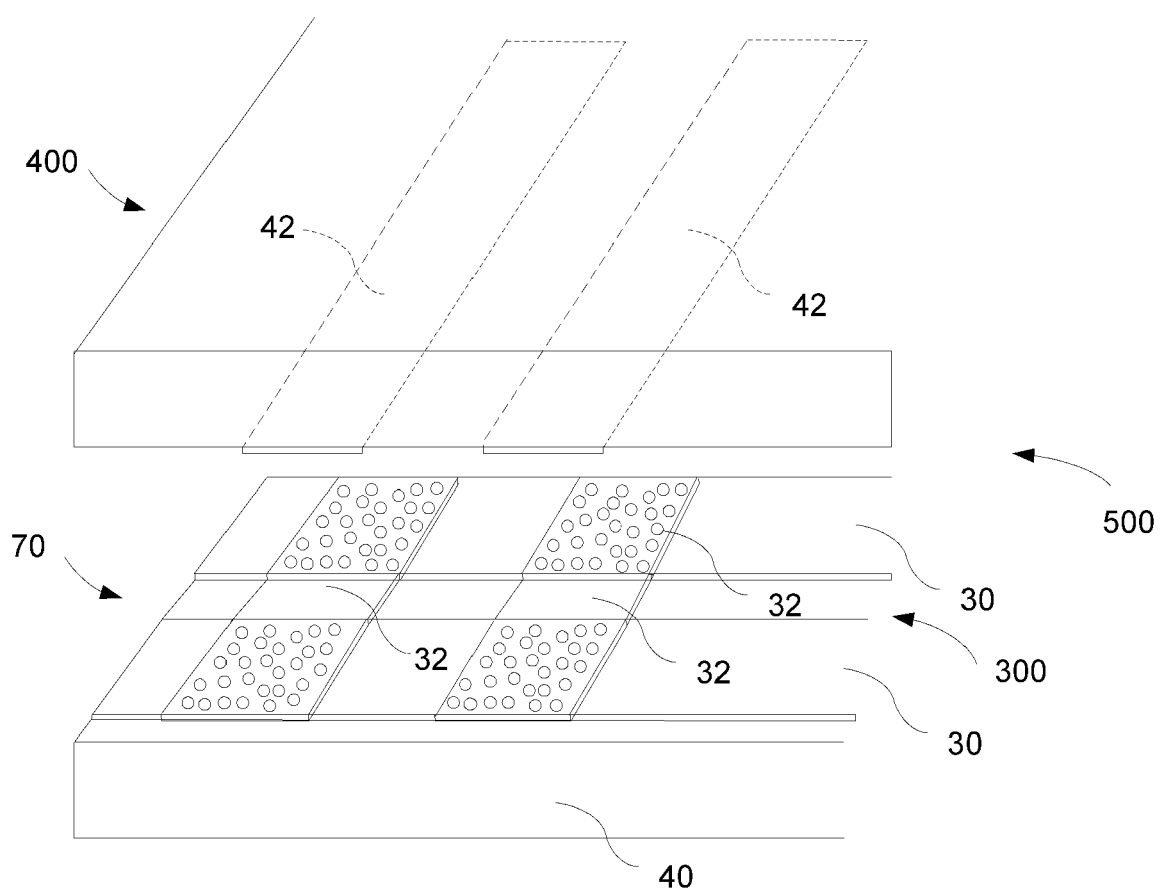
FIG. 9 shows a display according to the current invention.

FIG. 9 schematically illustrates an addressable display 500. An addressable electron source 300 on a glass substrate is positioned opposite and with a vacuum gap 70 from an anode plate 400. The anode plate consists of glass substrate, an array of transparent, parallel and electrically isolated anodes deposited on the glass and phosphor screens disposed over each anode electrode. ITO (Indium Tin Oxide) is one of the typical materials often used as a transparent electrode. The cathode electrode is configured as an array of strip-like cathode electrodes extending substantially in the same direction and to be spaced and electrically insulated from each other at intervals in the transverse direction. The nano-structures are distributed in patches along the cathodes with a density of, for instance, $10^8/cm^2$ in each patch. The gate electrode is configured as array of strip-like gate electrodes extending in the direction that intersect with the array of cathode electrodes at each patch of nano-structures and to be spaced and electrically insulated from each other at intervals in the transverse direction. Apertures are formed in the gate electrode and gate insulator, each aligned with and exposes one nano-structure in the emitter layer. The transparent anode electrode is configured as an array of strip-like anode electrodes, each extending opposed to the corresponding one of the gate electrodes. When a selected cathode and a selected gate electrode strip are activated, a selected intersection or pixel emits electrons and generates a light spot when the electrons strike the phosphor screen on the correspondingly selected anode electrode.

In both the embodiments shown in FIG. 8 and FIG. 9, the nano-structures are distributed along and over the cathode electrodes in patches. However, this is not necessary for an electron source or display to be addressable. In fact, the nano-structures can be distributed continuously either over and along the cathodes or over the entire substrate. Since only at the intersections where both cathode and gate electrodes are present, the nano-structures at other locations will not emit electrons. It should also be pointed out that when a conductive material is used to embed the nano-structures in an addressable electron source or display, care must be taken to maintain the electrical isolation between the cathodes. Using a non-conductive material to fill the space between the cathodes should solve the problem.

It is to be understood that the embodiments described above are illustrative of only a few of the many possible specific embodiments that can represent applications of the principles of the invention. Numerous and varied other arrangements can be readily devised by those skilled in the art without departing from the spirit and scope of the invention.

What is claimed is:

1. An emission electron source comprising:
    a cathode electrode disposed on a substrate, the cathode electrode for providing a source of electrons;
    an emitter layer disposed over said cathode electrode and formed from a composition of an embedding material and one or a plurality of nano-structures embedded therein, the embedding material having a surface above which portions of the nano-structures protrude to emit electrons;
    an insulator disposed over the emitter layer, the insulator having one or a plurality of apertures, each exposing at least the ends of the nano-structures in the emitter layer; and
    a gate electrode disposed over the insulator and having one or a plurality of apertures, wherein each aperture exposes a single nano-structure and is concentrically self-aligned with the end of the nano-structure, the gate electrode being operative to control the emission of electrons through the apertures from the exposed nano-structures;
    wherein the insulator and the embedding material are composed of the same dielectric material.

2. An emission electron source comprising:
    a cathode electrode disposed on a substrate, the cathode electrode for providing a source of electrons;
    an emitter layer disposed over said cathode electrode and formed from a composition of a non-porous embedding material and one or a plurality of nano-structures embedded therein, the embedding material having a surface above which portions of the nano-structures protrude to emit electrons;
    an insulator disposed over the emitter layer, the insulator having one or a plurality of apertures, each exposing at least the ends of the nano-structures in the emitter layer; and
    a gate electrode disposed over the insulator and having one or a plurality of apertures, wherein each aperture exposes a single nano-structure and is concentrically self-aligned with the end of the nano-structure, the gate electrode being operative to control the emission of electrons through the apertures from the exposed nano-structures;
    wherein the nano-structures comprise a nonconductive core and a conductive shell.

3. An electron source as recited in claim 2, wherein said nano-structures are substantially vertical.

4. An electron source as recited in claim 2, wherein said nano-structures are individually spaced apart.

5. An electron source as recited in claim 2, wherein said emitter-to-gate distance for each nano-structure is substantially less than one micrometer.

6. An electron source as recited in claim 2, wherein the nano-structures have a surface density substantially higher than $10^6/cm^2$.

7. An electron source as recited in claim 2, wherein the nano-structures protrude above the surface of the emitting layer for not more than half of one micrometer.

8. An electron source as recited in claim 2, wherein the apertures in the insulator expose the entire protrusion portion of the nano-structures in the emitting layer.

9. An electron source as recited in claim 2, wherein the nano-structures have at least one of their three dimensions in the nanometer range.

10. An electron source as recited in claim 2, wherein the nano-structures include nano-tubes, nano-wires, nano-fibers, and nano-cones.

11. An electron source as recited in claim 2, wherein the nano-structures have a coating for enhanced field emission performance.

12. An electron source as recited in claim 2,
    wherein the nonconductive core is made from one of wide band gap semiconductors, including diamond, BN, AlN, AlGaN, GaN, GaAs, SiC, and ZnO.

13. An electron source as recited in claim 2,
    wherein the cathode electrode is configured as a plurality of electrically isolated cathode electrodes, each for supplying an independent source of electrons;
    wherein the gate electrode is configured as a plurality of electrically isolated electrodes, each intersecting with said cathode electrodes and having one or a plurality of apertures at each intersections, each gate electrode being operative to control the emission of electrons through the apertures along the gate electrode; and
    wherein activation of a selected cathode and a selected gate electrode determines an intersection where the nano-structures emit electrons.

14. An electron source as recited in claim 2, wherein said nano-structures are grown using a template and said template is at least part of the embedding material.

15. An electron source as recited in claim 2, wherein said nano-structures are truncated to substantially the same length.

16. A display comprising:
    an electron source that includes:
        a cathode electrode disposed on a substrate, the cathode electrode for providing a source of electrons;
        an emitter layer disposed over said cathode electrode and formed from a composition of an embedding material and one or a plurality of nano-structures embedded therein, the embedding material having a surface over which portions of the nano-structures protrude to emit electrons;

an insulator disposed over the emitter layer, the insulator having one or a plurality of apertures, each exposing at least the ends of the nano-structures in the emitter layer; and a gate electrode disposed over the insulator and having one or a plurality of apertures, wherein each aperture exposes a single nano-structure and is concentrically self-aligned with the end of the nano-structure, the gate electrode being operative to control the emission of electrons through the apertures from the exposed nano-structures; and an anode plate including a transparent anode electrode disposed over a glass substrate and a phosphor screen disposed over the anode electrode, the anode plate being positioned opposite to said electron source with a vacuum gap disposed therebetween;

wherein electrons are emitted from said nano-structures by applying a voltage between said cathode and gate electrodes, and are made incident on said phosphor screen to make luminous said phosphor screen.

17. A display as recited in claim 16, wherein the nano-structures are selected from a group of materials consisting of carbon, refractory metals and alloys, conductive ceramics, conductive ceramic composites, and doped semiconductors.

18. A display as recited in claim 17, wherein the carbon includes carbon nano-tube, carbon nano-fiber, and carbon nano-cone.

19. A display as recited in claim 16, wherein the nano-structures are substantially vertical.

20. A display as recited in claim 16, wherein the emitter-to-gate distance for each emitter is substantially less than one micrometer.

21. A display as recited in claim 16, wherein the nano-structures have a surface density substantially higher than $10^6/cm^2$.

22. A display as recited in claim 16,
wherein the cathode electrode is configured as a plurality of strip-like cathode electrodes extending substantially in the same direction in such a manner as to be spaced from each other at intervals in a direction transverse to the cathode strips, each cathode strip for providing an independent source of electrons;

wherein the gate electrode is configured as a plurality of strip-like gate electrodes extending orthogonal to the cathode strips so as to intersect said plurality of cathode electrodes and to be spaced from each other at intervals in a direction transverse to the gate strips, and having one or a plurality of apertures at each intersection, each gate electrode for controlling the emission of electrons through the apertures along the gate electrode; and wherein the anode electrode is configured as a plurality of strip-like anode electrodes each extending in such a manner as to be opposed to the corresponding one of said gate electrodes.

23. A display as recited in claim 16, wherein said nano-structures in the emitter layer are truncated to substantially the same length so that each exposed nano-structure in the gate aperture has substantially the same gate-to-emitter distance.

24. A display as recited in claim 16, wherein the nano-structures have at least one of their three dimensions in the nanometer range.

25. A display as recited in claim 16, wherein the nano-structures include nano-tubes, nano-wires, nano-fibers, and nano-cones.

26. A display as recited in claim 16, wherein the nano-structures have a coating for enhanced field emission performance.

27. A display as recited in claim 16, wherein the nano-structures comprise a nonconductive core and a conductive shell.

28. A display as recited in claim 27, wherein the nonconductive core is made from one of wide band gap semiconductors, including diamond, BN, AlN, AlGaN, GaN, GaAs, SiC, and ZnO.

29. A display as recited in claim 16, wherein said nano-structures are individually spaced apart.

30. A display as recited in claim 16, wherein the insulator and the embedding material are composed of the same dielectric material.

31. A display as recited in claim 16, wherein said insulator functions also as the embedding material.

32. A display as recited in claim 16, wherein the embedding material includes a template that was used to grow the nano-structures.

* * * * *